United States Patent [19]

Johnstone et al.

[11] Patent Number: 4,628,441

[45] Date of Patent: Dec. 9, 1986

[54] AUTOMATIC DYNAMIC ERROR COMPENSATOR

[75] Inventors: Richard Johnstone; Edward E. Kirkham, both of Brookfield; Han C. Chung, West Allis; Lyle D. Ostby, Milwaukee, all of Wis.

[73] Assignee: Kearney & Trecker Corporation, Milwaukee, Wis.

[21] Appl. No.: 509,214

[22] Filed: Jun. 29, 1983

[51] Int. Cl.⁴ .................. G05B 19/18; G05B 19/29; G06F 15/46

[52] U.S. Cl. .................. 364/167; 364/474; 364/475; 318/603

[58] Field of Search ............ 364/148, 167, 169, 170, 364/174, 183, 474, 475; 318/600, 601, 603, 607, 608, , 661; 324/260, 261, 262, 263, 235, 207

[56] References Cited

U.S. PATENT DOCUMENTS

| | | | |
|---|---|---|---|
| 3,205,485 | 9/1965 | Noltingk | 324/207 X |
| 3,764,775 | 10/1973 | Hasslinger | 364/170 |
| 3,828,168 | 8/1974 | O'Callaghan et al. | 318/603 X |
| 3,898,440 | 8/1975 | Fukuma et al. | 364/170 |
| 3,917,930 | 11/1975 | Davey et al. | 364/167 X |
| 4,087,749 | 5/1978 | McCormack | 324/263 X |
| 4,101,817 | 7/1978 | Maeda et al. | 318/603 |
| 4,109,185 | 8/1978 | Froyd et al. | 318/603 X |
| 4,204,257 | 5/1980 | Hungerford | 364/474 |
| 4,207,505 | 6/1980 | Falck et al. | 318/661 X |
| 4,268,786 | 5/1981 | Röhrle | 318/661 |
| 4,272,818 | 6/1981 | McDaniel | 364/167 |
| 4,365,301 | 12/1982 | Arnold et al. | 364/475 |
| 4,376,970 | 3/1983 | Ilseman et al. | 364/183 X |
| 4,384,332 | 5/1983 | McMurtry | 364/474 |
| 4,386,407 | 5/1983 | Hungerford | 364/474 |
| 4,467,252 | 8/1984 | Takeda et al. | 318/603 |
| 4,494,206 | 1/1985 | Imazeki et al. | 364/167 X |
| 4,499,546 | 2/1985 | Kuga et al. | 364/474 |
| 4,510,426 | 4/1985 | Michaels et al. | 318/603 X |
| 4,554,495 | 11/1985 | Davis | 364/474 |

*Primary Examiner*—Jerry Smith
*Assistant Examiner*—Jon D. Grossman
*Attorney, Agent, or Firm*—Quarles & Brady

[57] ABSTRACT

An automatic dynamic error compensator for compensating the position error arising within a servo drive system includes a measuring head which is operative to measure the relative indicated position of two or more measuring vanes on the movable member. The measuring head, together with a feedback transducer, that measures indicated movable member position, are coupled to a feedback system. The feedback system determines the indicated movable member position from the feedback transducer reading and then compares the indicated movable member position to the known vane position upon occurrence of a vane crossing to yield a compensating value.

10 Claims, 14 Drawing Figures

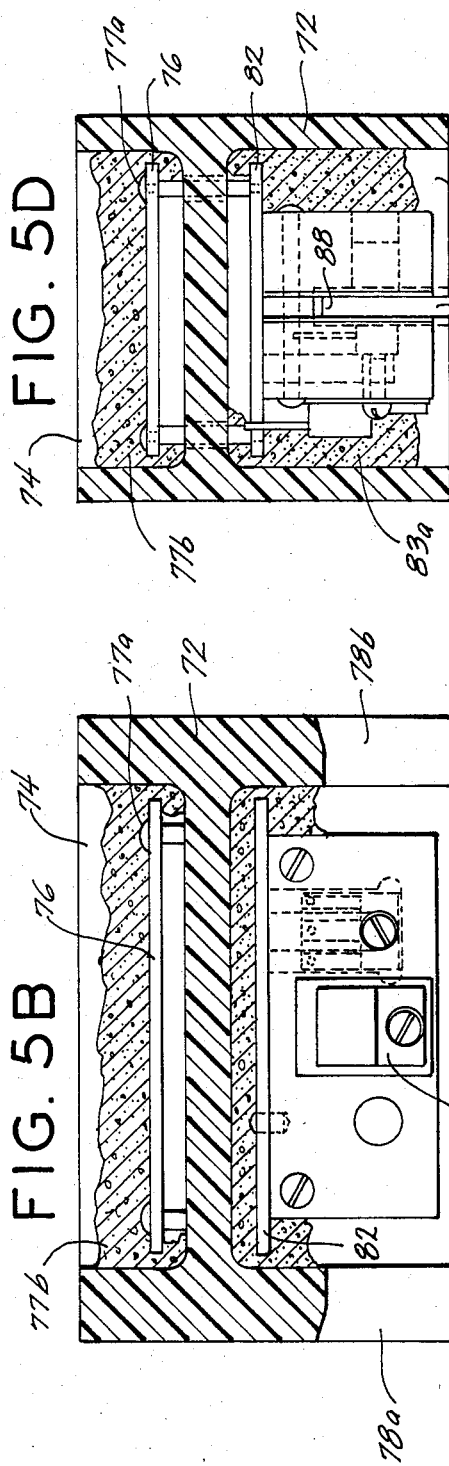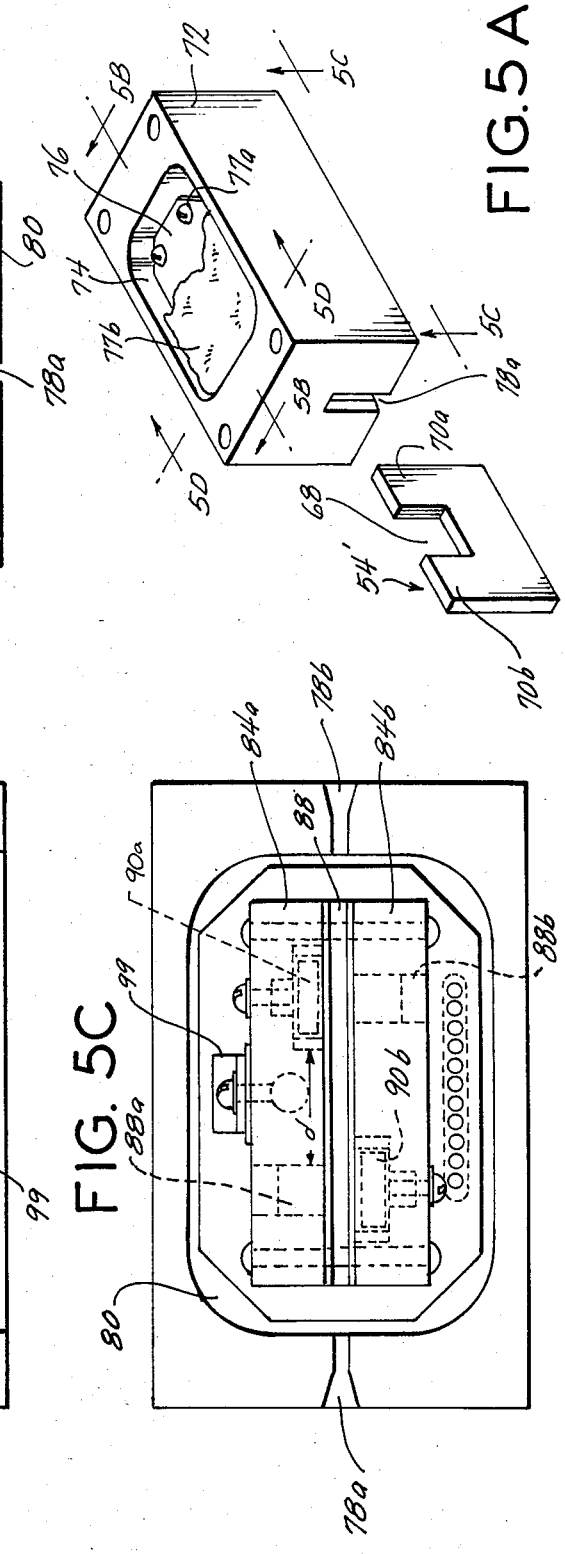

ADEC LOGIC FLOW

AUTOMATIC DYNAMIC ERROR COMPENSATOR

BACKGROUND OF THE INVENTION

This invention relates generally to an axis position detecting system such as are employed on numerically controlled machine tools, robots or coordinate measuring machines. More specifically, this invention relates to an axis positioning system which achieves automatic and dynamic compensation of position error.

The development of high precision hydraulic and electric servo drive systems has enabled repeated positioning of the separate axis slides on present day machine tools etc. with very high accuracy. As a result, productivity has been improved because large quantities of parts can now be manufactured automatically to very precise tolerances. More recently, the servo drive technology developed previously for machine tools has been employed in the construction of robots and coordinate inspection machines. Although present day machine tools, robots and coordinate measuring systems include very sophisticated servo drive systems having very accurate feed back transducers for detecting movable member positions, some position error is inevitable.

For the most part, position error occurs in machine tools and the like because of thermal expansion. Friction between the nut and lead screw, the mechanism commonly employed to achieve precise movable member positioning, usually leads to thermal expansion of the lead screw. Thermal expansion of the lead screw results in the movable member being at a position different than that recorded by the control system controlling member movement. While temperature sensitive elements, such as a thermistor, have been employed to measure temperature variation to enable the positioning control system to effect compensation for position errors due to thermal expansion, such systems have not generally proven adequate.

Additional factors also contribute to the position error. An error in the gross fabrication of the lead screw results in a repeatable position error which is generally smaller than the thermal error but a position error nonetheless. In the past, the error attributable to deficiencies in fabrication of the lead screw has been compensated for by the use of an error table often referred to as a "laser" table.

The laser table derives its name from the device which is used to measure the actual axis slide positions, at the time the machine tool is fabricated. A laser interferometer is commonly employed to precisely calibrate each of the machine tool axes slides and for each slide, the error compensation value, if any, for each of a plurality of slide positions is stored as a separate one of the table entries together with that slide position. Thus, at any predetermined slide position, the error compensation can be obtained from the table entry of the laser table associated with that slide. While the laser table enables adequate error compensation for long distances of movable member movement, the laser table has not proven itself as an adequate mechanism for compensation of position errors which occur during short axis slide movements.

Another factor which contributes to the slide position error is the eccentricity of the pulley or gear on the lead screw and the pulley or gear on the motor which drives the lead screw. The lead screw pulley or gear eccentricity and motor pulley or gear eccentricity generally result in a sinusoidally varying position error. In addition to the error attributable to the motor pulley or gear eccentricity and lead screw pulley or gear eccentricity, some position error arises as a consequence of the eccentricity of the pulley or gear on the feedback transducer which is usually a resolver or the like. This position error also varies sinusoidally.

Most present day positioning control systems utilize a resolver as the feedback transducer. As may be appreciated, a resolver is only one type of feedback device that can be employed to provide position feedback information. The resolver, when excited with a fixed frequency signal, produces a signal whose phase shifts as the movable member moves. A zero crossing detector is usually employed to detect the phase shift to enable determination of the movable member position. The zero crossings of the resolver output signal may be erratic, especially during movable member acceleration. Also, a latency exists between the time the zero crossing occurs and the time that the zero crossing is detected by the control system. As a consequence, the actual position of the movable member will be different from that recorded in the memory of the control system.

Position errors of the type described above are very undesirable. When position errors arise in the course of machine tool operation, the machine tool accuracy is impaired. Position errors arising in the course of robot operations results in inaccurate robot arm movement which may lead to inaccurate part placement, inaccurate welding or inaccurate part measurement, depending on the robot application. Position errors are also undesirable in coordinate inspection machines as they impair the accuracy of the measurement obtained.

In contrast to the prior art, the present invention is directed to an improved positioning system which automatically and dynamically compensates for positioning errors to increase the movable member positioning accuracy.

BRIEF SUMMARY OF THE INVENTION

Briefly, the present invention concerns an automatic dynamic error compensator for a servo drive system for compensating position errors, particularly those attributable to thermal changes, so as to achieve increased position accuracy.

The automatic dynamic error compensation of the present invention generally includes three elements, a feedback transducer for providing an indication of the movable member position, a position verifier for verifying when the movable member has passed by at least one known fixed position, and preferably between two known fixed positions and a feedback processor which compensates for the position error, if any, between the actual movable member position, as obtained from the position verifier, and the nominal movable member position as detected by the feedback transducers.

In practice, the feedback transducer may include a resolver for providing an output signal indicative of member movement, and a feedback circuit for processing the resolver output information to yield a position count representative of the movable member position. The position verifier takes the form of one or more stationary vanes, each mounted along the path of a movable member at a fixed location which is precisely known, and a vane detector head carried by the movable member. The vane detector head includes at least one vane detector which takes the form of a magnet and Hall effect sensor separated from each other by a slot aligned with the vane. Preferably, the vane detector head includes the pair of magnets and corresponding Hall effect sensors. Upon passage of the vane through the slot, the output signal of each Hall effect sensor changes logical states, thus indicating a vane passage. The feedback processor, which is contained within the machine tool control system, is coupled to the feedback circuit and to the vane detector head for effecting comparison between the indicated vane position and the actual vane position. The feedback processor accomplishes such a comparison by statistically averaging the resolver velocities at several sampled intervals to yield a statistically refined resolver indicated position line relationship. After that statistical relationship is known, the indicated vane position can be calculated from the least square line fit at the time at which the vane crossing occurred. Once the indicated resolver position has been calculated at the time of a vane crossing, then the position error, if any, can be obtained by subtraction.

The error between the actual and indicated member position, if not excessive, is then introduced into the position control program to compensate for position errors.

An object of the present invention is to provide a temperature insensitive system for a machine which can be used as a standard of measurement so as to facilitate compensation of position errors. The system includes at least one and preferably a pair of vanes mounted on the machine bed at precisely known locations so as to be within the path of movement of a vane detector carried by the machine slide. The distance between the vanes thus represents a length standard so that upon passage of the vanes, the exact distance of travel of the slide is known. Also since the position of each vane is precisely known, the indicated slide position can be compensated for errors by comparing the indicated position to the known position at the time of a vane crossing.

Another aspect of the present invention is the use of an improved feedback circuit for processing the output signal of the feedback transducer to yield a more precise nominal position count. The improved feedback circuit includes a position latch which not only stores information indicative of output count of the feedback transducer, but also stores information indicative of the time at which the feedback count of the resolver was stored. Knowledge of the exact time when the feedback transducer count was latched enables compensation of the variations in the resolver indicated position caused by motion induced changes in the resolver carrier frequency. The knowledge of when the resolver signal was latched allows the resolver signal to be "time normalized" so as to permit the servo system to obtain a smoother velocity. The achievement of smoother velocity is very important in a machine tool as it assures a smoother surface finish.

Yet another aspect of the invention is an improved method for obtaining the slide position at any point in time and, in particular, at the instant a vane crossing occurs. The statistical average velocity of the slide is calculated by obtaining a normalized indicated resolver position each of several equally spaced intervals to yield a resolver indicated time position relationship. Once the statistical average velocity or slope of the line is determined, the nominal vane position at any instant can be readily determined from a knowledge of both statistical resolver velocity and the time of the vane crossing.

BRIEF SUMMARY OF THE DRAWINGS

The features of the invention believed to be novel are set forth with particularity in the appended claims. The invention itself, both as to organization and method of operation, together with further objects and advantages thereof, may best be understood by reference to the following description taken in conjunction with the accompanying drawings in which:

FIG. 5a is a perspective view showing the complete detector head embodying a pair of vane detectors;

FIG. 5b is a cut away side view taken along lines 5b-5b of FIG. 5a;

FIG. 5c is a cut away bottom view taken along lines 5c-5c of FIG. 5a;

FIG. 5d is a cut away end view taken along lines 5d-5d of FIG. 5a;

DESCRIPTION OF THE PREFERRED EMBODIMENT

Figure 1:
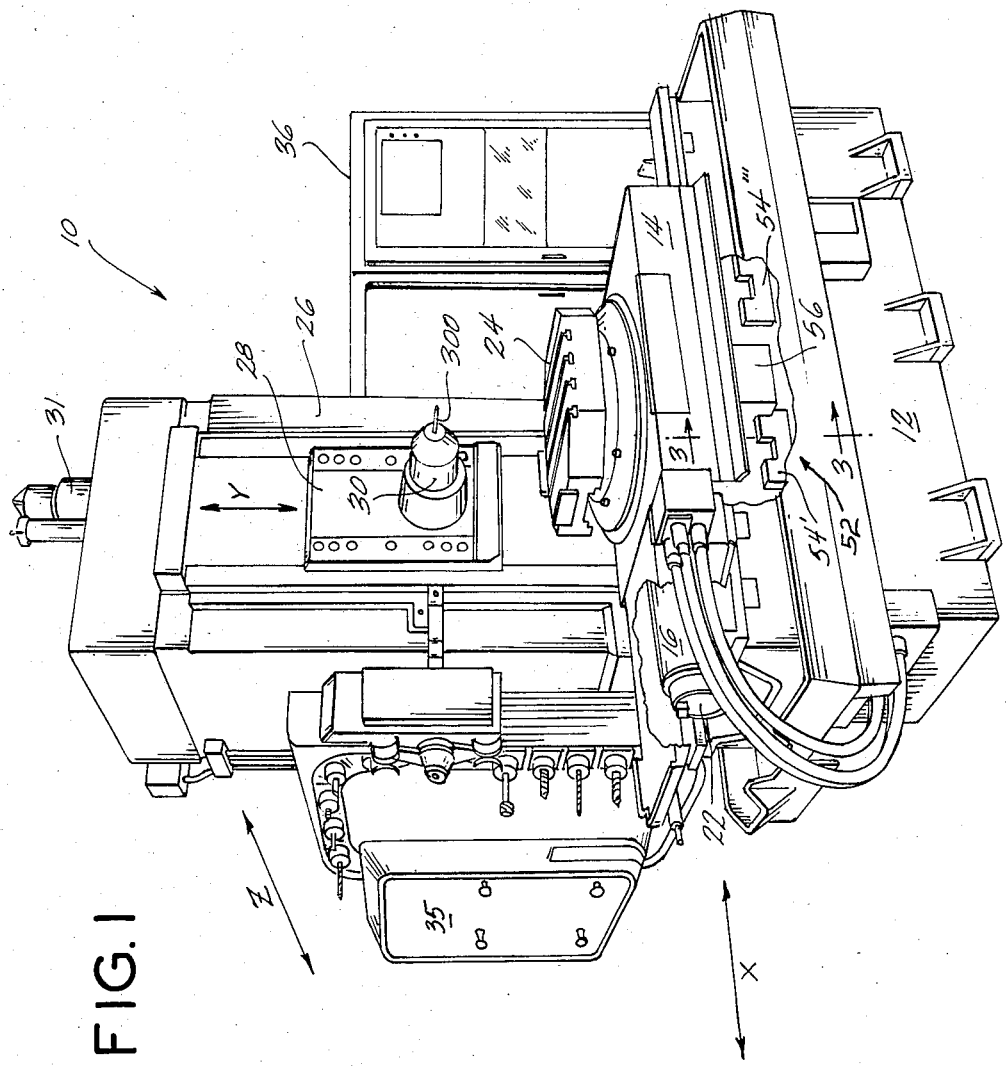
FIG. 1 is a perspective view of a machining center (machine tool) which embodies the automatic dynamic error compensator of the present invention.

FIG. 1 illustrates a machine tool 10 which embodies the automatic dynamic error compensator of the present invention. Machine tool 10 takes the form of an automatic tool changing machining center and includes a bed 12 on which is slidably mounted a table base 14 (more generally referred to as a slide) for movement on the bed along a linear path, hereinafter designated as the X axis. A motor 16 is connected via a gear box 18 (shown in block form in FIG. 2) to a lead screw 20 (also shown in block form in FIG. 2) which threadedly engages a nut (not shown) secured to the slide 14 so that the slide is driven along the X axis by the servo controlled motor 16. Mechanically connected to motor 16 is a feedback transducer 22 which typically takes the form of a resolver which, when energized, provides an electrical output signal indicative of the motor shaft position. Since motor 16 is rigidly linked to the slide 14 through the gear box 18, the lead screw 20 and the lead nut secured to the slide, the resolver output signal varies in accordance with the slide position along the X axis.

Rotatably journaled into slide 14 is a table 24. The table is rotatably indexed by conventional means such as a worm gear and wheel (not shown), the worm gear and worm wheel being driven by a servo controlled motor (not shown) similar to motor 16.

In addition to the slide 14 being movable on bed 12, an upright or column 26 is also slidably mounted on the bed for movement thereon along an axis, designated as the Z axis, which is perpendicular to the X axis. The column 26 is propelled along the bed 12 by conventional means which include a lead screw and lead nut (not shown), the lead screw being driven by a servo controlled motor (not shown). The column 26 carries a spindle head 28 which mounts a tool carrying spindle 30 that is driven by a motor typically located within the spindle head (not shown). The spindle head 28 is slidably mounted on the column and is propelled therealong by conventional means, such as a lead screw and lead nut (not shown), the lead screw driven by a servo controlled motor 31. The axis of spindle head 28 movement on column 26 is designated as the Y axis.

Also associated with the machine tool 10 is a tool changer 35 for automatically exchanging tools between a storage magazine and the spindle.

Control of the rotation of the machine tool spindle 30 as well as the movement of the table 24, the table base 14, the spindle head 28 and the upright 26, together with the operation of the automatic tool changer 35, is accomplished by the machine tool control system 36. The control system 36 typically takes the form of a Kearney & Trecker CNC control system that is modified in the manner discussed hereinafter. A general discussion of the control system 36, sufficient for the purpose of understanding the automatic dynamic error compensator of the present invention, may be had by reference to FIG. 2 which is a simplified, partial block diagram of the machine tool 10 and its associated control system 36. To simplify the discussion of control system 36, only that portion of the control system associated with the control of the movement of a single machine tool axis slide such as slide 14 is illustrated. It should be understood that the movement of the other machine tool axes are controlled in a like manner with like circuitry. The remainder of the control system for controlling the spindle rotation and the tool changer operation is of conventional construction and is therefore not shown.

Figure 2:
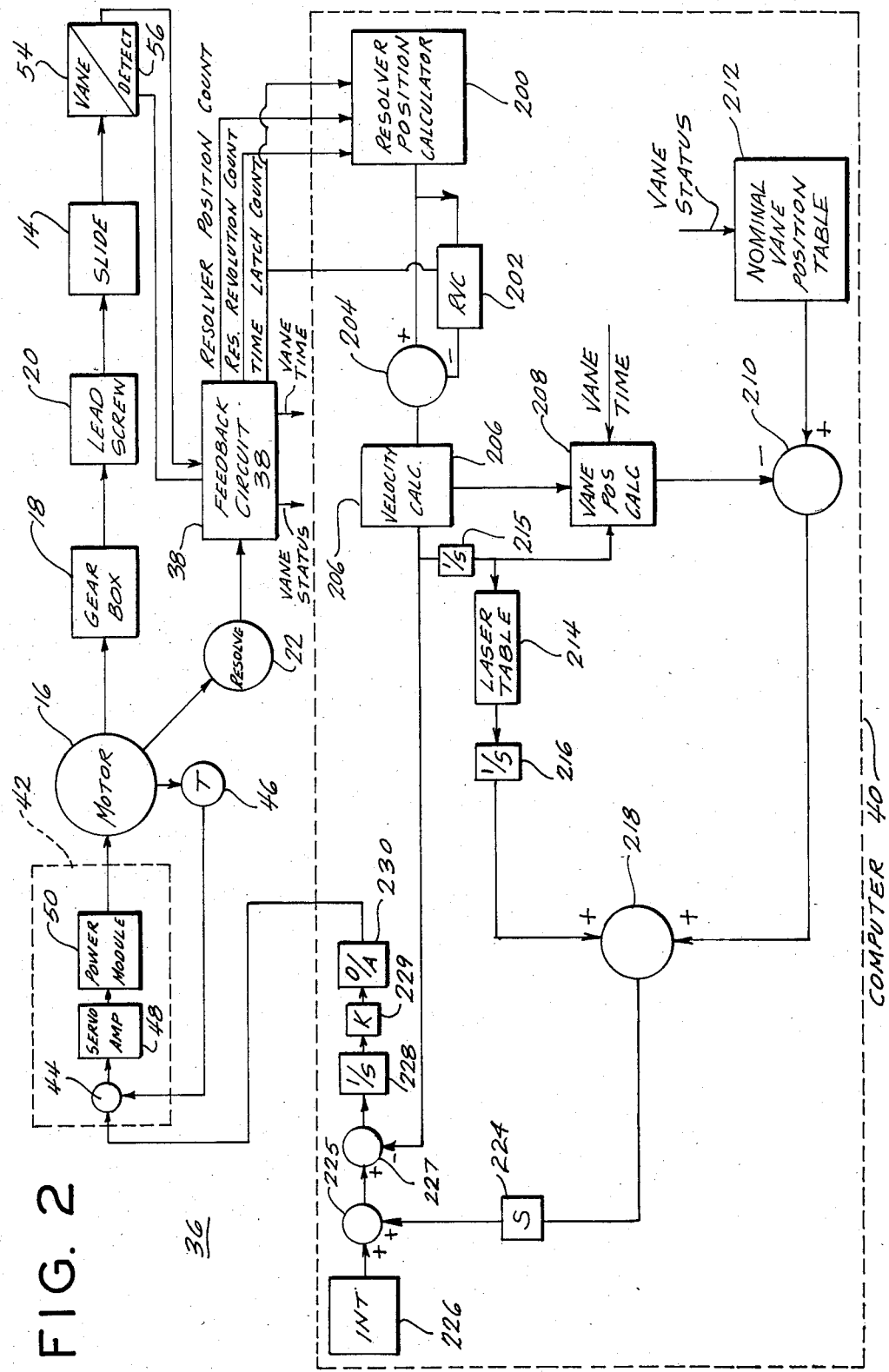
FIG. 2 is a block diagram of the machine tool of FIG. 1 illustrating the details of the control system which includes the automatic dynamic error compensator.

Referring now to FIG. 2, the resolver 22 associated with motor 16, when excited by feedback circuit 38 in a manner described hereinafter, outputs a signal whose phase angle shifts proportional to the distance of resolver rotor movement. The feedback circuit 38 (described in greater detail in FIG. 7) also contains conventional circuitry for processing the phase shift of the resolver output signal to yield a digital count referred to as the resolver position count (Np) representing the resolver position.

The digital resolver position count is supplied to the control processing unit 40 of control system 36, which central processing unit typically takes the form of a digital computer. In practice, computer 40 is programmed in a conventional manner to sample the resolver position count at periodic intervals. The resolver position is then compared to the commanded position, as determined from the commanded slide position designated by the machine part program, to yield a digital motor drive signal for driving the motor. This digital signal is converted into an analog signal that is supplied to the servo drive circuit 42 controlling motor 16.

Servo drive system 42 is conventional in its structure and includes a circuit taking the form of a summing amplifier 44 which algebraically sums the analog command signal from the computer 40 with the output signal of a tachometer 46 that is driven from the motor 16. The output signal of the summing amplifier, which represents the commanded motor excitation, is then processed by a servo amplifier 48 to yield the driving signal supplied to the power module 50. It is the power module 50 that supplies the excitation to motor 16 to drive the motor.

Thus far described, the machine tool 10 and its associated control system 36 are conventional in their construction and are known in the art. The particular construction details of the machine tool 10 are not important with respect to the structure of the automatic dynamic error compensator of the present invention, except insofar as the automatic dynamic error compensator serves to automatically and dynamically compensate for machine tool slide position errors. In fact, the automatic dynamic error compensator of the present invention, although, described hereinafter with respect to machine tool 10, may be readily employed with other types of servo control systems, such as those associated with coordinate measuring systems or robots, to compensate for movable member position errors.

As discussed at the outset, conventional machine tools such as machine tool 10 are subject to the disadvantage that position accuracy may vary as a consequence of thermal drift due to the friction between the slide and the machine tool bed. Also, some position error arises as a result of variances in fabrication tolerances. To compensate for position errors attributable to these factors, machine tool 10 is provided with an automatic dynamic error compensator which includes position verifier 52 illustrated in FIG. 1 for precisely verifying the slide 14 position at each of several locations on bed 12. The position verifier 52 includes a pair of end vanes 54' and 54" and a medial vane (not shown in FIG. 1, but illustrated in FIG. 4) which are each located at precisely known positions on the bed 12 along the path of slide 14 movement. A vane detector head 56, which described in greater detail with respect to FIGS. 5a–5c, and FIG. 6 as including a pair of vane detectors therein, is mounted on the undersurface of table base 14 by a detector clamp 57 (FIG. 3) so as to be in alignment with the vanes so as to cross one or more vanes upon slide 14 movement.

Figure 4:
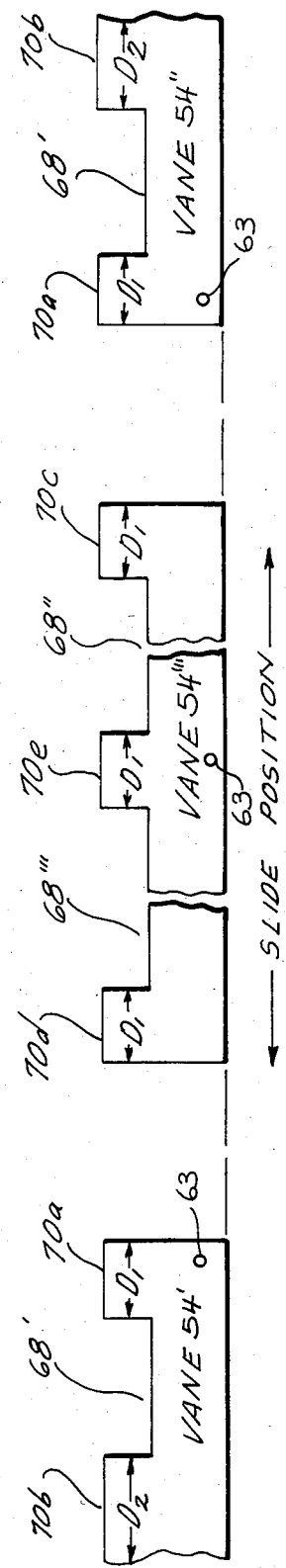
FIG. 4 is a schematic of the vane arrangement on the machine tool bed.
Figure 3:
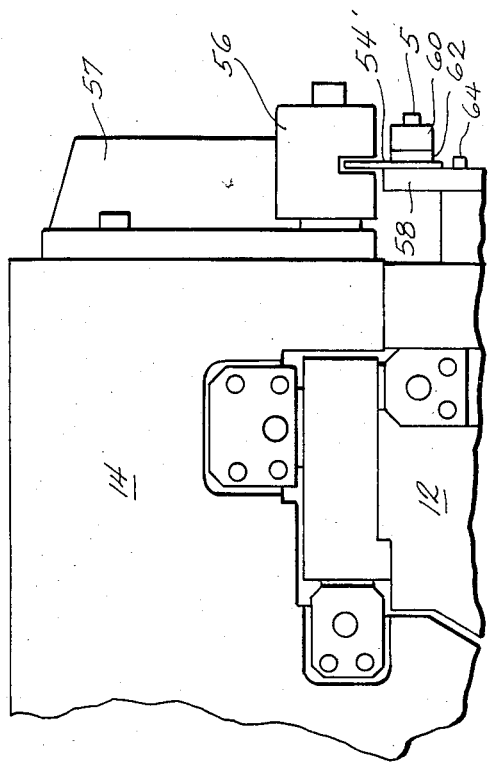
FIG. 3 is a partial cross section end view taken along lines 3—3 of FIG. 1 illustrating the mounting of the position verifier vane to the machine tool bed.

Referring now to FIG. 3, which is a cutaway view of a portion of the base 12 and slide 14, each vane such as vane 54' for example is affixed to the bed 12 by first mounting the vane to a vane support 58 by way of a vane clamp 60. A compressible neoprene spacer 62 separates the vane clamp 60 from the vane support 58. The resilience of the neoprene spacer allows the spacer to act as a spring to apply a light and uniform pressure against the vane 54'. In this way, the vane support can thermally expand without stretching the vane which has a near-zero coefficient of expansion. As best illustrated in FIG. 4, each vane, such as vane 54', is pinned by a pin 63 to its corresponding vane support to keep the pin from shifting. Referring back to FIG. 3, the vane support is itself secured to bed 12 by a support clamp 64.

Each of the vanes takes the form of a strip of magnetically permeable metal which remains substantially constant in length, notwithstanding temperature variations. One metal which has been found well suited for vane construction is INVAR Steel, manufactured by Carpenter Technology Corporation. Because of the relative insensitivity of each vane to changes in temperature, the location of each vane on the bed 12 remains substantially fixed. Moreover, the particular manner in which each vane such as vane 54' is mounted to the bed 12 by way of the vane clamp 60, the spacer washer 62, and the vane support 58 allows the bed 12 to thermally expand without altering the length of each vane on the bed. Because the thermal coefficient of the INVAR Steel from which each vane is typically manufactured is negligible, the distance between vane nibs is essentially constant. Therefore, any apparent change in the vane length, as determined in the manner described hereinafter, is essentially attributable to growth of the lead screw.

As best illustrated in FIG. 4, bed 12 typically carries three spaced apart vanes 54', 54" and 54'". The outermost vanes 54' and 54" are each located adjacent to one of the outermost ends of bed 12 to mark the left and right hand end of slide 14 travel and thus appear adjacent to the left and right hand ends of the figure. Each of the outermost vanes 54' and 54" has a single rectangular notch 68' cut into the top of each of the vanes to create a pair of upstanding vane nibs 70a and 70b. The location of the notch 68' in each of vanes 54' and 54" is such that the nib 70a of each of vanes 54' and 54" is of a length $D_1$ which is shorter than the length $D_2$ of the other nib 70b of each vane. Following a description of the configuration of one of the vane detectors 56, it may be appreciated that the longer of the vane nibs 70b of each of vanes 54' and 54" enables a vane detector 56 to sense when the slide has reached each end of its travel. In this way, the vane detector serves the function of an end of travel limit detector thereby obviating the need for conventional limit switch mechanisms.

The central-most vane 54'" has a pair of spaced apart notches 68" and 68'" cut into the top thereof to create three, spaced apart nibs 70c, 70d and 70e respectively, each of a length $D_1$. The distance between the outermost edge of each of nibs 70c and 70d is 10 inches (25.4 cm) although other distances may be substituted. Since the distance between nibs 70c and 70d is precisely fixed, movement of the slide 14 through this fixed distance, as detected by one of the vane detectors within the vane detector head 56 can thus be compared with the indicated distance of slide movement as determined by the resolver. The difference, if any, is then utilized to correct for position error. Thus, the vane 54'" serves as a length standard.

Vane detector head 56 comprises a steel shell 72 having a top recess 74 (FIGS. 5a, 5b and 5d) sized to receive a circuit board 76 which carries a portion of the electronic circuitry of each of the vane detectors described below. Following insertion of circuit board 76 into recess 74, and fastening of the circuit board to the shell by way of screws 77a, potting compound 77b fills the remaining volume of recess 74 to shield circuit board 76 from the environment.

As best illustrated in FIGS. 5b and 5c, a pair of longitudinal slots 78a and 78b extend inwardly from the opposed front and back bottom edges of the shell 72 into a bottom central recess 80 which underlies recess 74. Like recess 74, recess 80 is dimensioned to receive a circuit board 82 which carries another portion of the electronic circuitry associated with the pair of vane detectors within head 56. Potting compound 83a fills the void within recess 80 after the circuit board 82 has been secured within the recess by screws 77a.

Referring to FIG. 5c, the circuit board 82 within recess 80 mounts a pair of blocks 84a and 84b which are separated from one another by a U-shaped channel 88 (FIGS. 5c and 5d) in axial alignment with slots 78a and 78b so that a vane such as vane 54' may pass therethrough.

To detect the passage of a vane through the channel 88, the vane detector head 56 mounts a pair of vane detectors, each comprising a magnet and Hall effect sensor. To this end, block 84a mounts a magnet 88a and a Hall effect sensor 90a spaced a distance d apart from each other. Likewise, block 84b mounts a magnet 88b and a Hall effect sensor 90b which are each located opposite to the Hall effect sensor 90a and magnet 88a. For so long as the flux path between each magnet and its corresponding Hall effect sensor remains unobstructed, the output signal of that Hall effect sensor remains at a first logic level. If, however, the flux path between a magnet and Hall effect sensor is obstructed, such as occurs when the nib of a vane passes therebetween, then the output level of the Hall effect sensor changes to the other logic level.

Figure 6:
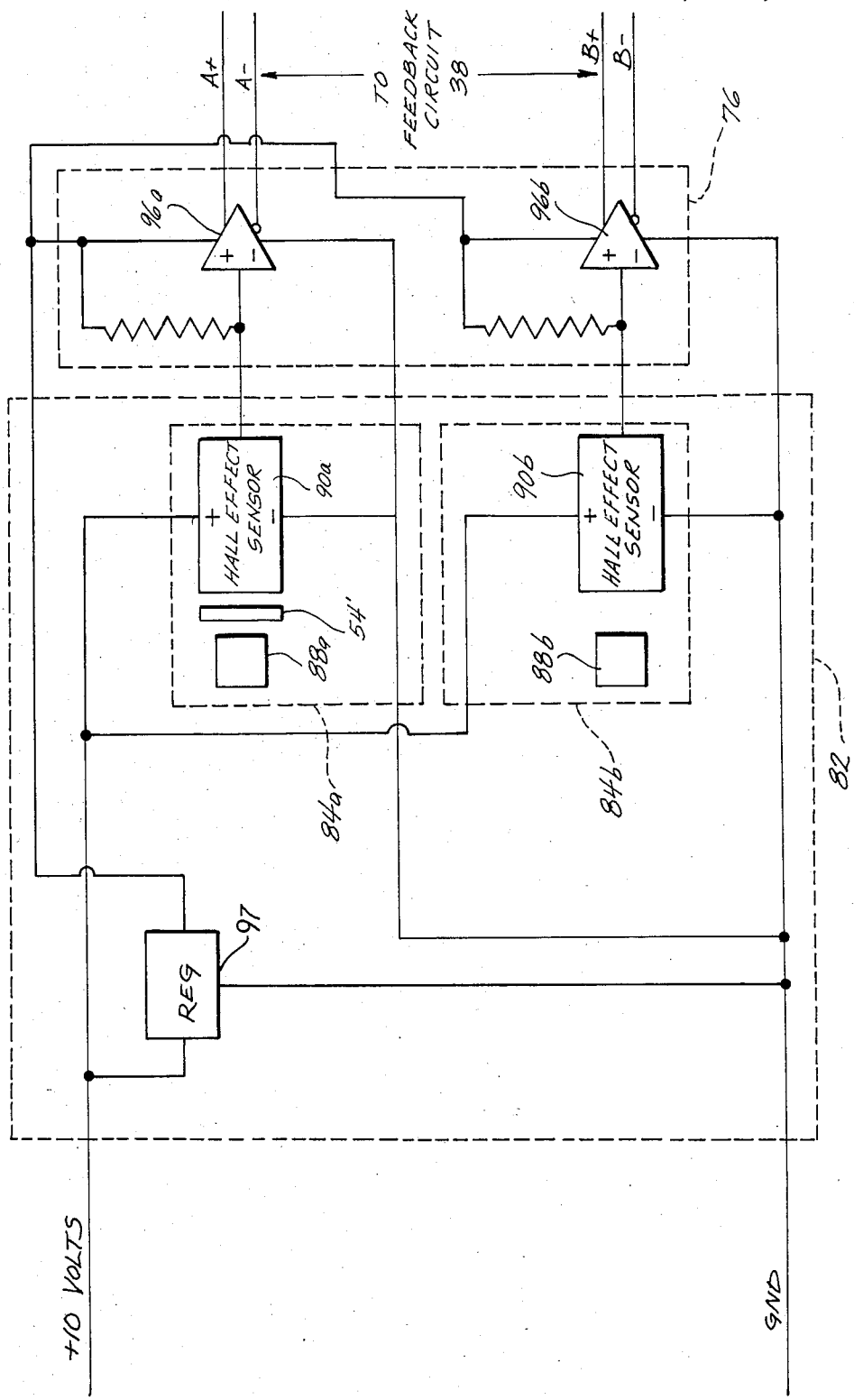
FIG. 6 is a representative schematic view of a vane detector sensor circuit.
Figure 7:
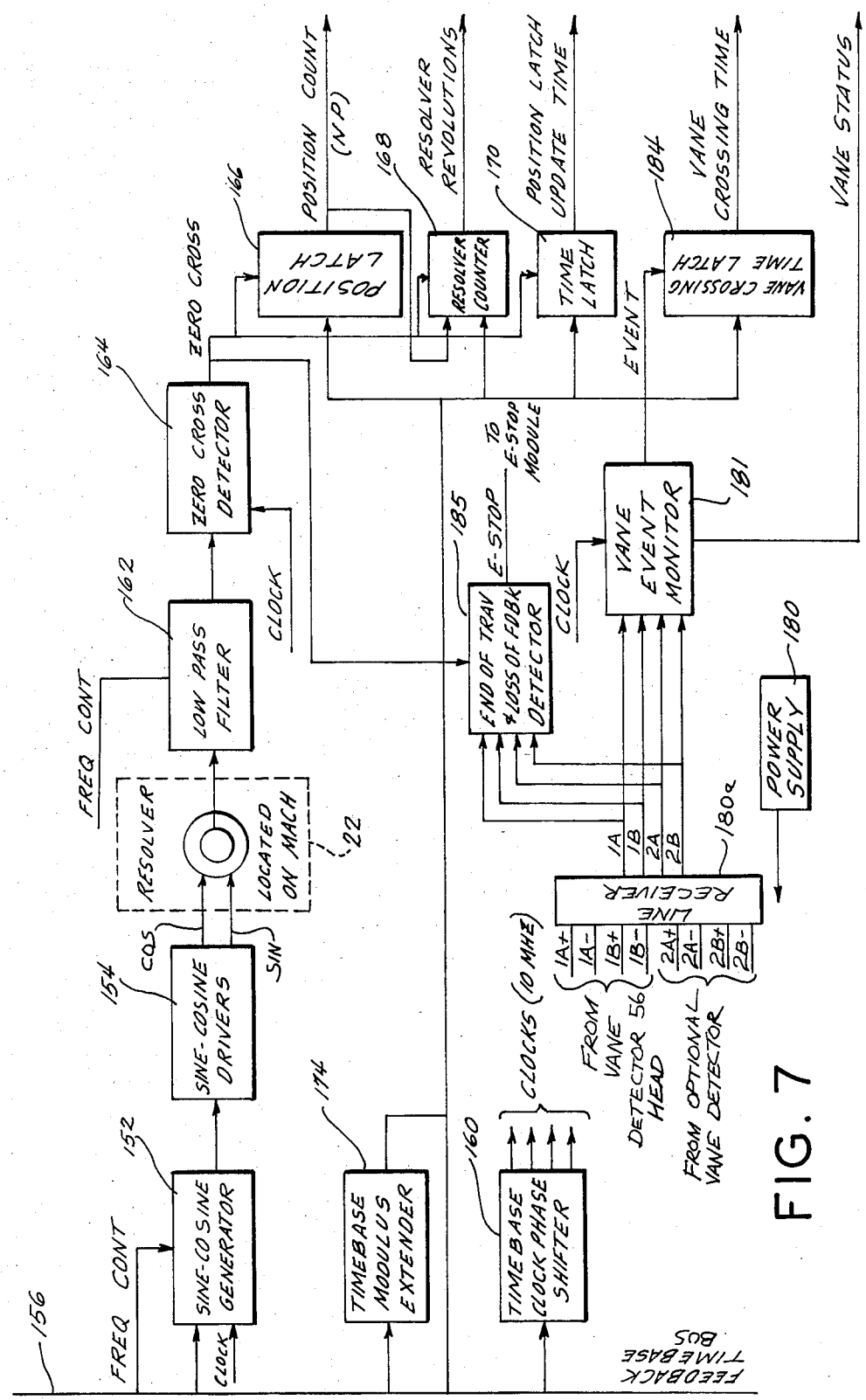
FIG. 7 is a representative block diagram of the improved feedback circuit of the machine tool control system.

FIG. 6 illustrates, in schematic form, the sensor circuitry also mounted by circuit board 82 for exciting each of the Hall effect sensors 90a and 90b and for transmitting the output signal of each Hall effect sensor to the feedback circuit 38 of FIG. 7. Each of the Hall effect sensors 90a and 90b which are mounted on blocks 84a and 84b, respectively, (shown in phantom) are energized from a D.C. supply (not shown) with a 10 volt D.C. voltage. In this way, when a vane, such as vane 54' passes between magnets 88a and Hall effect sensor 90a, the logic state of the output signal of Hall effect sensor 90a changes state. Similarly, when a vane such as vane 54'" passes between the Hall effect sensor 90b and its associated magnet 88b, the logic state of the output signal of that Hall effect sensor changes in a like manner.

Each of the Hall effect sensors 90a and 90b is coupled at its output to a corresponding one of line drivers 96a and 96b which are energized with a 5 volt D.C. voltage from a 5 volt regulator 97 that is energized from the 10 volt supply. Line driver 96a supplies a balanced pair of output signals (A+ and A−) to the feedback circuit 38 in accordance with the logic state of the output signal of the Hall effect sensor 90a. In a similar fashion, the line driver 96b supplies a balanced pair of output signals (B+ and B−) to the feedback circuit 38 in accordance with the logic state of the output signal of the Hall effect sensor 90b.

While only one set of vanes 54', 54" and 54'" and one vane detector head 56 are illustrated in FIG. 1, a second set of vanes (not shown) each identical to the vanes 54', 54" and 54'", and a second vane detector head (not shown) identical to vane detector 56 may be optionally provided opposite to each of the vanes 54', 54" and 54'" and vane detector head 56, respectively, to detect the yaw of the slide as well as to provide redundancy and hence greater reliability. As will become better understood hereinafter, the feedback circuit 38 of FIG. 7 is designed to accommodate both of the vane detector heads associated with the slide. To distinguish the output signals of each of the vane detector heads, the prefix "1" or "2" precedes the identification of the signals of each vane detector head. For example, the output signals from the vane detector 56 of FIG. 1 will hereinafter be identified by 1A+, 1A−, and 1− B whereas the signals of the optionally provided second vane detector head (not shown) will be identified as 2A+, 2A−, 2B+ and 2B−.

As may now be appreciated from a description of vane detector 56, if the vane nib 70b on each of vanes 54' and 54" is made of a length $D_2$ such that $D_2 > d$ (that is to say that the vane nib 70b is longer than the distance between Hall effect sensors 90a and 90b), then upon passage of the vane nib 70b of either of vanes 54' or 54" past vane detector 56, the vane nib 70b first crosses between one of the Hall effect sensors 90a and 90b and its associated magnet and then crosses between the other Hall effect sensor and its associated magnet while still blocking the first of the Hall effect sensors from its associated magnet. This causes the output signal of both Hall effect sensors to be at the same logical level shortly after the vane nib 70b crosses the first Hall effect sensor. In contrast, when the shorter vane nib 70a of vanes 54' or 54''' or when one of nibs 70c, 70d and 70e of vane 54''' pass through a vane detector, only one Hall effect sensor is actuated at a time, the shortness of the vane nibs preventing both Hall effect sensors from being actuated at once. Thus, each of the vane detectors may operate as an end of travel limit detector as described previously. It should be noted that the output level of each of Hall effect sensors 90a and 90b does not change instantaneously upon the passage of a vane nib. Rather, brief propagation delay is usually present between the instant that the nib of the vane obstructs the flux path between the Hall effect sensor and magnet and the time when the Hall effect sensor output signal changes states. However, this propagation delay is not detrimental and can easily be compensated for.

Although not essential to the operation of each vane detector head 56, it is nevertheless desirable to maintain the the Hall effect sensors 90a and 90b at an elevated temperature of approximately 140 degrees Fahrenheit to reduce the effect of threshold variations due to variations in ambient temperature. To this end, a heating element 99 illustrated in FIGS. 5b–5c, which typically takes the form of a power semiconductor, is secured to block 84a to heat the block. When the block 84a, which is illustrated by a dashed line in FIG. 6, is heated by heating element 99, the block thus keeps the Hall effect sensors 90a and 90b and their associated magnets at a constant elevated temperature.

To effectively utilize the output signals of the Hall effect sensors 90a and 90b to correct position errors in control system 36, it is necessary to detect not only the precise location of the vane, as well as when the vane crossing occurred, but it is also necessary to detect exactly what the resolver position was at the instant of the vane crossing. With most present day machine tools, the output signal of the resolver, which represents the nominal position of the slide, is sampled at periodic intervals, typically a few miliseconds in duration. Thus, unless a vane crossing coincides with a resolver interrupt, a comparison of the actual slide position, as determined from a vane crossing, against the indicated resolver position will not yield any meaningful information so as to allow for correction of the resolver position. In order to facilitate comparison of the actual machine slide position to the indicated machine slide position following a vane crossing, machine tool 10 is provided with an improved feedback circuit 38 which functions not only to provide data indicative of the nominal slide position in accordance with the resolver output signal, but also functions to determine exactly when a resolver zero crossing occurred as well as exactly when a vane crossing occurred to enable comparison of the nominal resolver position to the exact slide position to facilitate error correction.

A block diagram of the improved feedback circuit 38 of the automatic dynamic error compensator of the present invention is illustrated in FIG. 7. Referring to that figure, feedback circuit 38 includes conventional circuitry for energizing the resolver 22 including a sine-cosine generator 152 and a sine-cosine driver 154 which are both conventional and well known in the art. The sine-cosine generator 152 is excited with a 13 bit digital high frequency signal appearing on bus 156 (12 bits plus one clock bit), the signal being generated by a crystal controlled oscillator (not shown). The sine-cosine generator is periodically clocked by a clock signal as supplied from the time base clock phase shifter 160, which takes the form of a well known delay line (not shown) for delaying the clock signals generated by a clock circuit (not shown) of conventional construction. Upon receipt of the clock signal, the sine-cosine generator 152 generates a pair of square wave signals designated COS and SIN, the SIN signal being phase shifted 90 degrees from the COS signal. Each of the COS and SIN signals is supplied via the sine-cosine driver 154 to the resolver 22 to excite the stationary resolver cosine and sine windings respectively (not shown). When the resolver cosine and sine windings are excited with the COS and SIN signals, respectively, a quasi-sinusoidal signal is induced in the resolver rotor winding (not shown) which is coupled to the input of a low pass filter 162. The low pass filter 162, which is conventional in construction, filters the resolver rotor output signal in accordance with the frequency signal on bus 156 to yield a sine wave signal which is supplied to a zero crossing detector 164, also conventional in its construction. The zero crossing detector, when clocked with a clock signal from the time base clock phase shifter 160, outputs a pulse designated zero cross every time the square wave output signal of low pass filter 162 undergoes a negative-to-positive zero crossing.

The zero crossing detector output pulse is supplied to the clock input of a 12 bit latch 166 whose 12 data inputs are each supplied with a separate one of lower order 12 bits of the 13 bit frequency signal appearing on bus 156. Each time the resolver rotor winding signal undergoes a zero crossing, the latch 166 is strobed so that the latch stores the state of each of the 12 lower bits of the signal on bus 156. It is these 12 bits latched into the latch 166 which comprise the position count Np representing the resolver position. When, for example, the resolver rotor is stationary, then the position count Np subsequently strobed into the latch 166 remains the same as before. However, if the resolver is rotating, then the position count Np latched into the latch changes and the difference between the most recent and previous position counts is therefore indicative of slide movement.

At high slide speeds, a position ambiguity can arise as a result of the resolver position count going through zero during the period between sampling of the position count. To resolve the position ambiguity when the slide 14 is moving at or above a predetermined speed, the feedback circuit 38 includes a resolver revolution counter 168.

The resolver revolution counter 168 is identical in structure and function to the zero position bi-directional counter of the "High Speed Digital Position Monitoring System" described and claimed in U.S. Pat. No. 4,376,970 issued on Mar. 15, 1983 to Ilseman et al. The resolver counter 168 is coupled to the position latch 166 and to the zero crossing detector 164 and provides a count at its output indicative of the net number of times and in which direction the position count Np stored in the position latch 166 went through zero. A knowledge of the net number of times and in which direction the position count Np goes through zero enables the subsequent resolver position count to be algebraically subtracted from the previous resolver position count without ambiguity to yield a count indicative of the incremental resolver movement. The resolver revolution counter 168 thus operates in a manner indentical to the zero position bi-directional counter of the aforesaid patent and for a further description of its operation, reference should be had to the aforesaid patent which is hereby incorporated by reference.

As thus far described, feedback circuit 38 is conventional in its construction.

As previously discussed, a drawback of conventional feedback circuitry such as that portion of feedback circuit 38 discussed thus far is that the indicated slide position is only known upon a zero crossing of the resolver output signal. Thus, if a vane crossing were to occur at an interval between zero crossings of the resolver rotor, then a meaningful comparison could not be had. To overcome this difficulty, a time latch 170 is provided for determining the exact instant when a resolver rotor or zero crossing has occurred so as to enable a nominal slide position to be calculated between zero crossings of the resolver output signal. The time latch 170 comprises a four bit latch whose four data inputs are each coupled to a separate one of the four highest-order bits of a 4 bit, high frequency digital signal superimposed upon bus 156 by a time base modulus extender 174 (described below).

Figure 8:
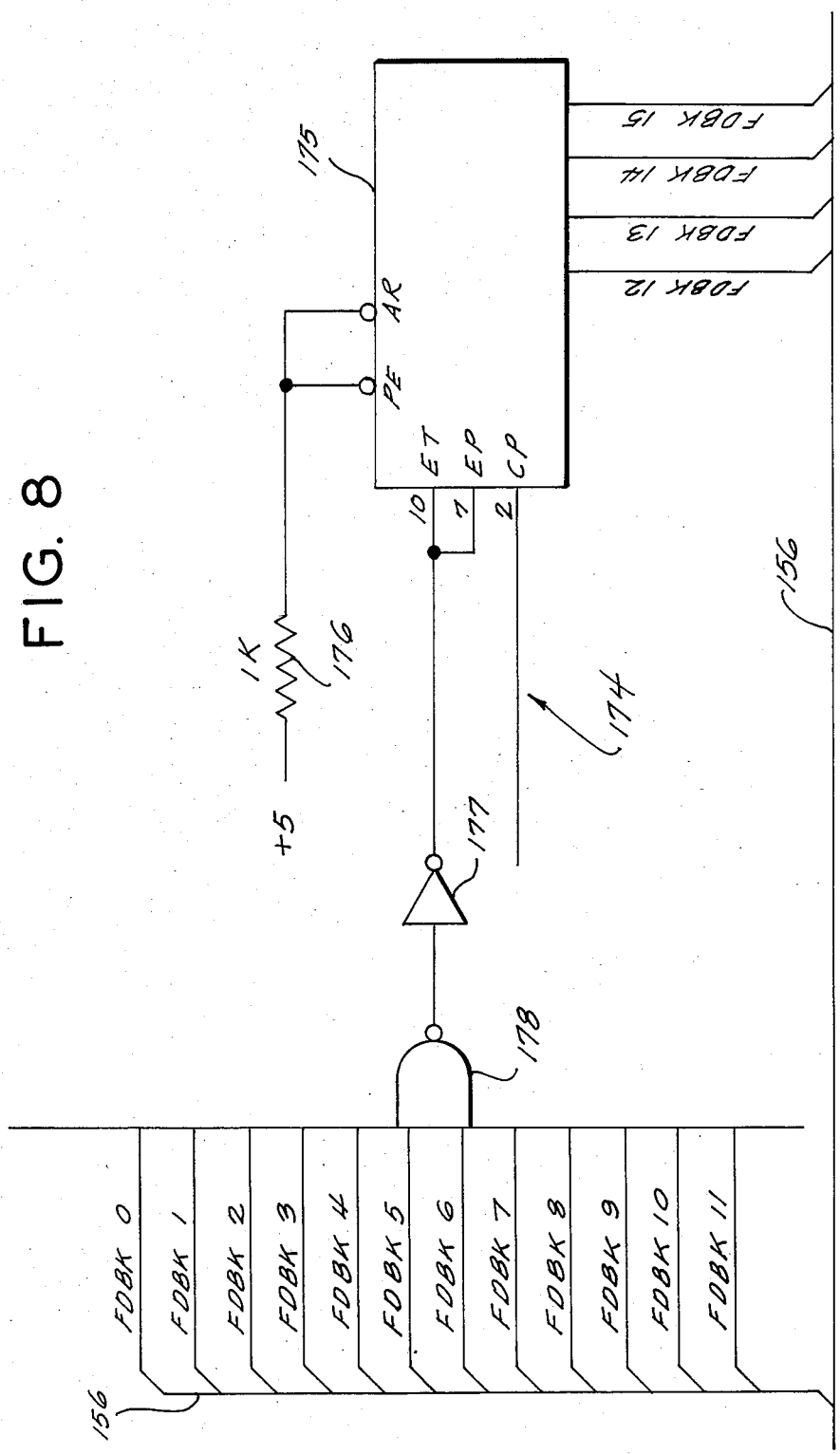
FIG. 8 is a representative block diagram of the time base modulus extender comprising part of the feedback circuit of FIG. 7.

Referring now to FIG. 8, the time base modulus extender 174 typically includes a four bit synchronous counter 175. The counter 175 is supplied at its preset enable (PE) and reset (AR) inputs with a five volt d.c. voltage from a power supply (not shown) through a resistor 176. The two enable inputs (ET and Ep) are jointly coupled through an inverter 177 to the output of a NAND gate 178 which NANDS the 12 lower order bits (FDBK 0-FDBK 11) of the 12 bit and 1 clock bit frequency signal on bus 156. The counter clock input (Cp) is supplied with a clock signal from the time base clock phase shifter 160 so that when all 12 bits (FDBK 0-PDBK 11) are at a logical "1", then the counter count is advanced by one. In this way, the 4 bit output count may be readily thought of as the 4 highest order bits of a 16 bit time base bus whose lowest 12 bits vary as the lowest 12 bits of the signal on bus 156. The four bit count of counter 175 represented by the bits FDBK 12-FDBK 15 are superimposed on the lower 12 order bits on bus 156 (FDBK 0-FDBK 11) to yield a 16 bit time base bus.

Returning to FIG. 7, the 4 highest order bits superimposed on bus 156 are strobed into time latch 170 upon the occurrence of a resolver zero crossing as detected by the zero crossing detector 164. The count stored in time latch 170 is thus representative of the exact time at which the resolver zero crossing appeared. As will become better understood hereinafter, a knowledge of the time at which a resolver zero crossing occurs enables calculation of the slide position during intervals between resolver zero crossings. Thus, the time base modulus extender 174 effectively "expands" the 12 lower order bits of the time base bus 156 to yield a 16 bit signal, the 4 highest order bits of which are latched into the time latch 170. In this way the time latch can provide a much more accurate record of when the resolver count was latched than would be the case if only the 12 lower order bits of the signal on bus 156 were counted.

The feedback circuit 38 not only serves to excite resolver 22 and to provide position information in accordance with the resolver output signal, but also, the feedback circuit 38 serves to interface each of the Hall effect sensors, of which make up each vane detector in each of the vane detector heads, and to process the output information from each vane detector, within each vane detector head to facilitate error compensation. To this end, feedback circuit 38 includes a power supply 180, conventional in construction, for exciting both the Hall effect sensors 90a and 90b in each vane detector head.

To process the output information of the two vane detectors (Hall effect sensors) within the vane detector head 56 and the two vane detectors (Hall effect sensors) of the optionaly provided vane detector head, the output signals 1A+, 1A−, 1B+ and 1B− from the vane detectors within the vane detector head 56 and the output signals 2A+, 2A−, 2B+ and 2B− from the optionally provided vane detector head are supplied to a line receiver 180a such as is well known in the art. The line receiver in turn provides output signals 1A, 1B, 2A and 2B, respectively, whose logic state is determined from the corresponding signal pairs 1A+ and 1A−, 1B+ and 1B−, 2A+ and 2A− and 2B+ and 2B−, respectively, so as to represent the actuation of a corresponding one of the Hall effect sensors. The output signals 1A, 1B, 2A and 2B from the line receiver 180a are supplied to a vane event monitor 181 whose details are illustrated in block form in FIG. 9.

Figure 9:
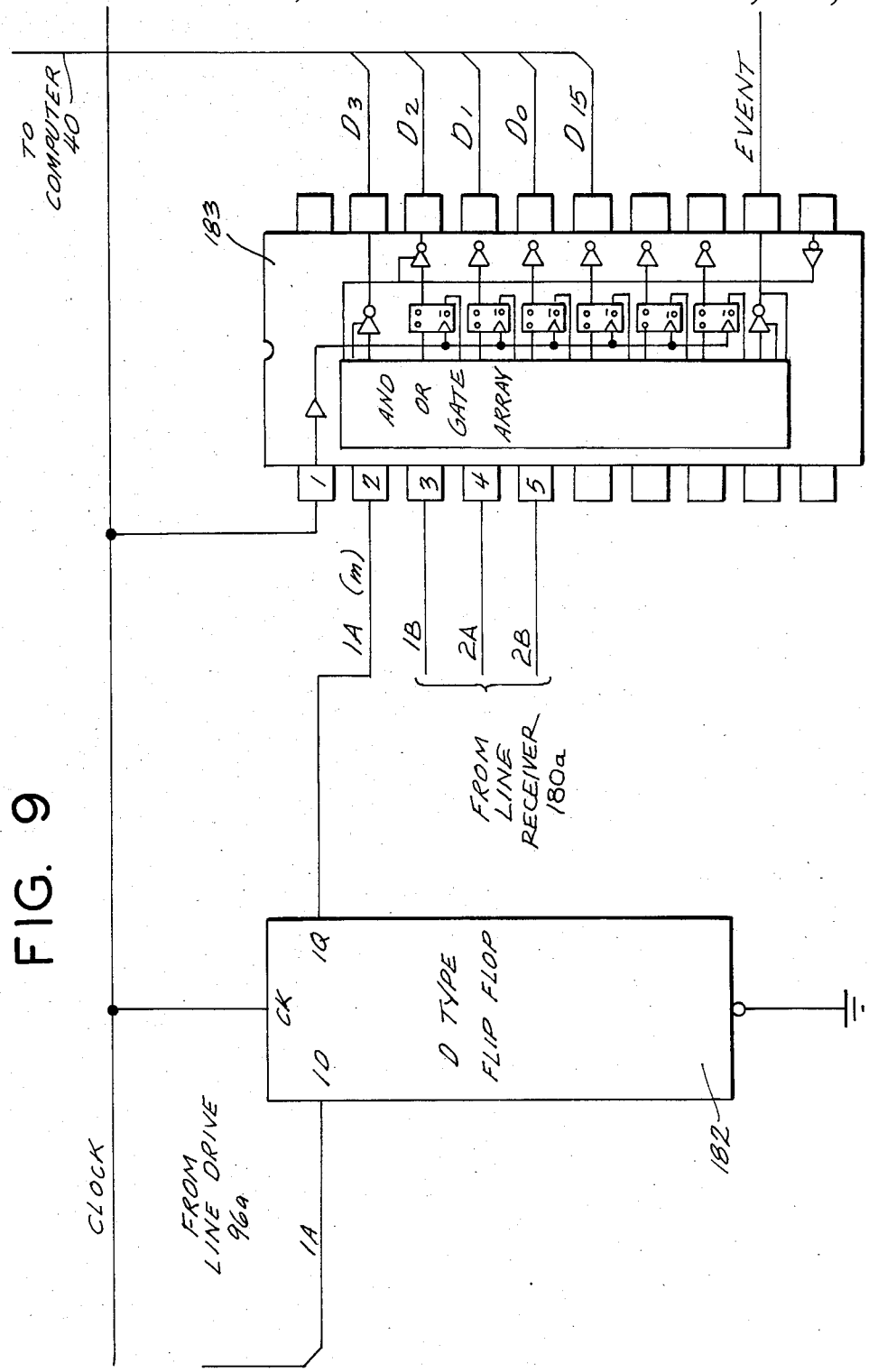
FIG. 9 is a representative block diagram of the vane event monitor comprising a portion of the feedback circuit of FIG. 7.

Referring to FIG. 9, vane event monitor 181 includes a D type flip-flop 182 whose D input (1D) is coupled through the line receiver 180a to one of the pair of outputs of the line driver 96a within vane detector head 56 so as to receive the output signal (1A) therefrom. When flip-flop 182 is supplied at its clock input (CK) with a clock signal (such as supplied from the time base clock phase shifter 160), the signal appearing at the output (1Q) of the flip-flop assumes the same logical state as the input signal at the first (1D) flip-flop input prior to the occurrence of the clock pulse. In this way, the flip-flop 182 serves to synchronize this vane detector output signal to the clock. The remaining line receiver signal 1B, representing the output state of the other of the Hall effect sensor of the vane detector within head 56, and the line receiver signals 2A and 2B, each representing the output signal of each Hall effect sensor of the optionally provided vane detector head are synchronized to the main clock signal by a programmable array logic gate 183.

To this end, the output signal 1A(m) present at the output (1Q) of the flip-flop 182 is supplied to the first input of a programmable array logic (PAL) gate 183. The other three inputs of the PAL gate 183 are each coupled to receive the remaining output signals (1B, 2A, and 2B) of the line receiver 180a. The PAL gate 183 operates to output a predetermined one of a set of 5 bit output signals in accordance with the sequence of the signals at its input. The particular sequence of input signals received at the PAL gate circuit is dependent on which of the 4 Hall effect sensors underwent a transition, so that the five bit output signal of the programmable array logic gate 183 identifies which Hall effect sensor has crossed a nib edge.

Additionally, the programmable array logic gate 183 also generates an EVENT signal upon the occurrence of a nib edge crossing by either pair of vane detectors. The EVENT Signal from the programmable array logic gate 183 is supplied to the clock input of a 16 bit vane crossing time latch 184 of FIG. 7. Upon receipt of the EVENT signal at the clock input of the vane crossing time latch 184, the latch stores each of the 16 data bits superimposed on the bus 156 to effectively record the time at which a vane crossing occurred.

As discussed previously with respect to FIG. 7, each of the pair of vane detector heads such as vane detector head 56 of FIG. 1 not only functions to verify the slide position, but also functions as a travel limit detector to determine when the end of slide travel is reached, thereby obviating the need for conventional limit switches. The continued operability of the Hall effect sensors within each vane detector head is thus essential. If, for instance, one or both of the Hall effect sensors 90a and 90b of a vane detector head such as vane detector head 56 became disabled, then a dangerous slide over-travel condition could occur before an orderly machine shutdown could be effected. To prevent the occurrence of a dangerous slide over-travel condition before an orderly machine shutdown can be effected, the feedback circuit 38 of FIG. 7 includes an end of travel and loss of resolver feedback signal detector 185. As its name implies, the end of travel and loss of feedback detector 185 monitors the Hall effect sensors of each vane detector head to determine whether or not they are operational and if so, whether or not an end of travel condition has occurred. Additionally, the end of travel and loss of resolver feedback signal detector 185 also detects a failure of the resolver circuit 22.

Figure 10:
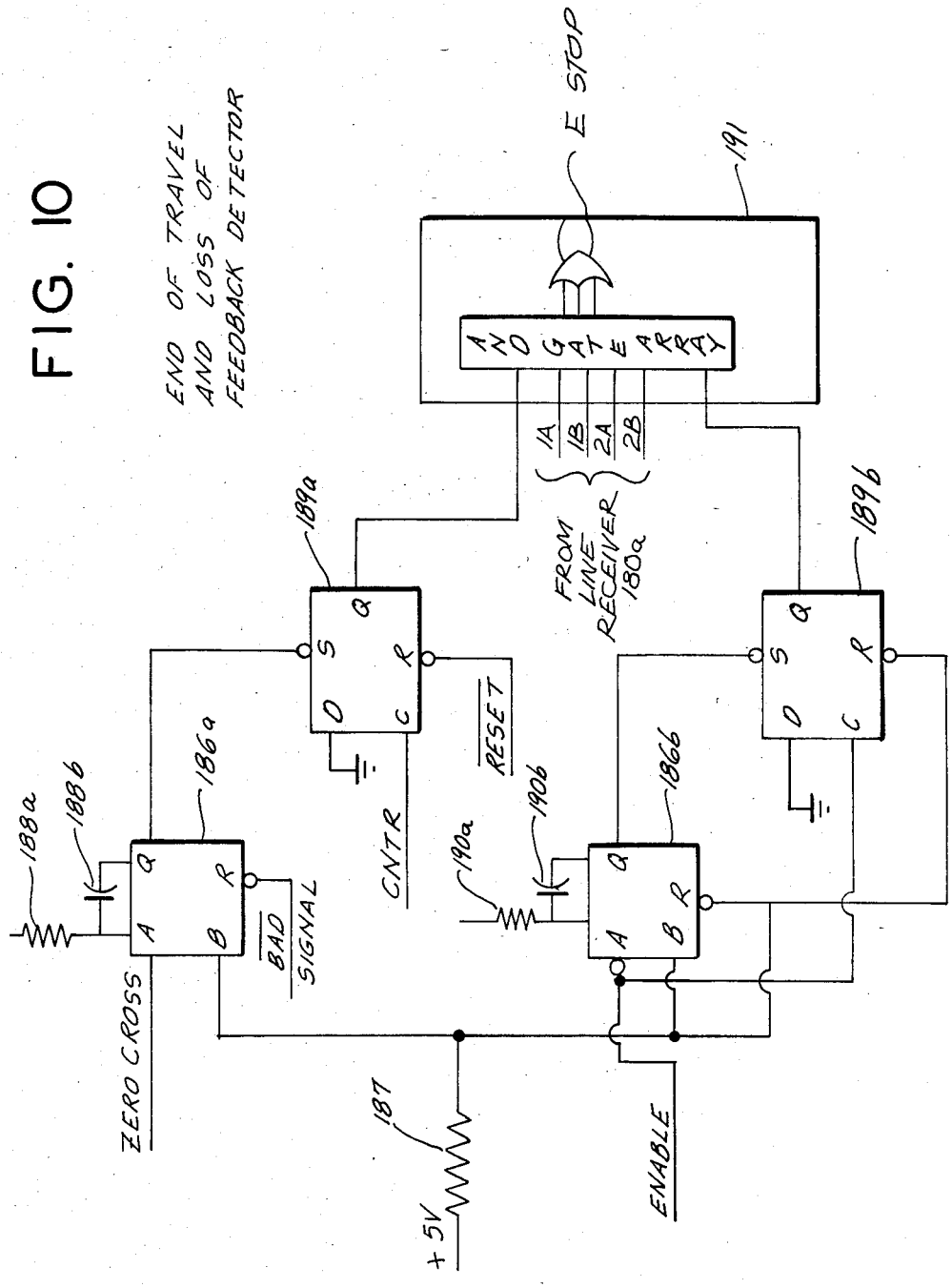
FIG. 10 is a representative block diagram of the end-of-travel and loss-of-feedback detector comprising part of the feedback circuit of FIG. 7.

The details of the feedback detector 185 are illustrated in block form in FIG. 10. Referring to that figure, the detector 185 includes a pair of monostable retriggerable multivibrators 186a and 186b. The first or A input of multivibrator 186a is coupled to the output of the zero crossing detector 164 of FIG. 7 to receive the output signal ZERO CROSS therefrom. The second or B input of the multivibrator 186a is maintained at a high logical level by virtue of being coupled to a +5 volt d.c. supply (not shown) through a resistance 187. The time constant of the multivibrator is established by the R.C network comprised of resistor 188a and capacitor at 188b which couple the multivibrator to the +5 volt supply.

Each time the zero crossing detector output signal (ZERO CROSS) undergoes a transition from a low logical level to a high logical level, then the monostable multivibrator 186a outputs a high logic level signal at its Q output which remains high for a time period proportional to the RC time constant of resistor 188a and capacitor 188b. The output signal at the Q output of monostable multivibrator 186a is supplied to the set (S) input of a D type flip-flop 189a. The D input of flip-flop 189a is coupled to circuit ground so that each time the flip-flop 189a is supplied at its C input with a CPU read signal (CNTR), the output signal at the Q output of the D type flip-flop 189a will clear, provided that the output of the multivibrator 186a is at a logical "1". In practice, the time constant of the multivibrator 186a is set such that while resolver 22 is operating, causing the ZERO CROSS signal to be above a certain frequency, the monostable multivibrator retriggers and outputs a high logic level signal at its Q output. If, however, no ZERO CROSS signal appears at the first input of the monostable multivibrator 186a, then the Q output signal of multivibrator 186b goes to a logic low state after a set interval, determined by the RC network of capacitor 188b and resistor 188a. When the output signal of monostable multivibrator 186a goes low, then the set (S) input of flip-flop 189a goes low setting the flip-flop 189a which signifies a failure of the resolver 22 or the zero crossing detector 164. Also, the monostable multivibrator 186a may be intentionally set to a low logic state, by impressing a low logic level signal BAD SIG at the monostable reset input. The signal BAD SIG goes to a low logic level when a signal detector (not shown) detects that the signal amplitude of the resolver 22 output signal drops below a predetermined level. To reset the flip-flop 189a, a signal reset is impressed on the reset (R) input to drive the input to a logic high state.

The second monostable retriggerable multivibrator 186b has its second or B input coupled through the resistance 187 to the +5 volt supply so as to be at high logic level. The first or A input of the multivibrator 186b is supplied with a signal (ENABLE), whose logic state changes each time the resolver latch 166 is read to determine the position count, which typically occurs every few milliseconds. When the A input of the multivibrator 186b changes from a logic low state to a logic high state, then the multivibrator Q output signal changes from a logic low state to a logic high state and remains at such a state for a time dependent on the RC time constant of the network of resistance 190a and capacitance 190b which couple the multivibrator to the +5 volt supply.

The Q output signal of multivibrator 186b is supplied to set (S) input of a second D type flip-flop 189b whose D input is grounded. The clock input of the flip-flop 189b is coupled to the B input of the monostable multivibrator 186b so that the output signal at the Q output of the D type flip-flop 189b, when the flip-flop is clocked by the ENABLE signal, is dependent on the signal at the set (S) flip-flop input. The reset input (R) of both the multivibrator 186b and the D type flip-flop 189b are coupled through resistance 187 to the +5 volt d.c. supply so that the reset input remains a logic high state.

In practice, the time constant established by the RC network of resistance 190a and capacitance 190b is such that the Q output signal of the monostable multivibrator 186b remains at a high logic state provided that the ENABLE signal goes to a logic low state every few milliseconds as will occur normally during the operation of the machine control system. While the Q output signal of the monostable multivibrator 186b remains at a logic high state, then the Q output signal of the flip-flop 189b remains a logic low state each time the flip-flop is clocked by the enable signal. However, should the ENABLE signal fail to change logic states every few milliseconds, then the flip-flop 189b outputs a logic high signal which signifies a failure of the machine tool control to read the position latch to determine the resolver position count within the desired sampling interval.

The Q output signal of each of flip-flops 189a and 189b is supplied to one of the six inputs of an AND gate array 191. The remaining inputs of the AND gate array are coupled to the line receiver 180a of FIG. 8 so as to receive the signals 1A, 1B, 2A and 2B which represent the actuation of a corresponding one of the pair of Hall effect sensors of each of the corresponding one of the pair of vane detector heads. The AND gate array 191 logically combines the signals at its inputs to generate an output signal (E Stop) upon the occurrence of any of the three conditions:

1. The Q output signal of the flip-flop 189a goes to a logic high state, indicating a loss of feedback;
2. Both the line receiver signals 1A and 1B or both of line receiver signals 2A and 2B are at a logic high state, indicating that the end of slide travel has occurred or that the vane detector head 56 has been disconnected from the feedback circuit 38;
3. The output signal of the flip-flop 189b has gone to a logic high state, signaling that the latch 166 has not been read within the desired computer interrupt interval.

The signal E-STOP is supplied to the emergency stop module of the machine control 36 (not shown), which in response, effects an orderly but immediate machine shut down.

Referring to FIG. 2, the output data from the feedback circuit 38 representing the resolver position count NP (the count stored in latch 166), the resolver revolution count (the count stored in counter 168) and the resolver time latch count (the count stored in 174) is supplied to the computer 40 of the machine control 36 which is modified to include several subroutines including a resolver position calculator 200. The resolver position calculator 200 processes the output count Np of the position latch of the feedback circuit 38 to yield a resolver position count at its output representative of the incremental distance of resolver movement. In practice, the resolver position calculator is actually a program subroutine rather than a physical circuit, although as may be appreciated following a description of the subroutine program steps, the function of the resolver position calculator could be performed with conventional circuitry.

The resolver position calculator subroutine 200 includes the following steps:

1. The 12 bit resolver position latch count from latch 166 is concatenated with the 4 bit resolver latch time count from latch 170 to yield a 16 bit resolver position-time count.
2. The resolver revolution count from latch 168 is then examined and compared to the previous stored resolver revolution count. If the revolution count has decreased from the previous count, then the resolver rotor direction was negative (counter-clockwise) so that the position count had gone through zero in a negative direction. Conversely, had the count increased then the resolver rotor and hence the latch count had passed zero in a positive direction.
3. Once the direction of the resolver rotor zero crossing has been established, then the most recent 16 bit resolver position count is algebraically subtracted from the previous count, taking into account which direction the resolver latch count went through zero, to yield the resolver incremental position.

The resolver incremental position count INp, determined following the execution of subroutine 200, is then processed by a resolver velocity compensator 202. The resolver velocity compensator 202, also a program subroutine, includes the following steps:

1. The latest resolver time latch count from latch 174 is subtracted from the previous resolver time latch count to yield a quantity T diff representing the time interval between resolver zero crossings.

2. Having calculated the quantity T diff, then the incremental resolver position count INp is normalized according to the following formula:

$$\text{Normalized } INp = INp \frac{40960}{T \text{ diff}} \quad (1)$$

The purpose of normalizing the position count in this fashion is to effectively compensate for variations in the resolver indicated position. At a zero slide speed, there are exactly 10 resolver cycles/interrupt. When the slide moves, the number of resolver cycles/interrupt will vary between 9 and 11 depending on the slide movement. The resulting non-integer number of resolver zero crossings per interrupt gives rise to a frequency difference which leads to a resolver error. Multiplying the resolver incremental position count by the factor 40960/T diff compensates for this frequency difference by effectively shifting the resolver zero crossing to the start of the interrupt interval.

The normalized incremental position count determined by the subroutine 202 is algebraically combined at summing amplifier 204 with the position count determined by resolver position calculator 202 to yield a net normalized incremental resolver position count. The net compensated incremental resolver position count produced at the output of summing amplifier 204 may actually be thought of as the resolver velocity since the incremental resolver position count is the change in resolver position per interrupt interval.

Output data from the summing amplifier 204 representing the resolver velocity is then processed by a velocity calculator 206 which operates to statistically average the resolver velocities at each of several (typically 9) equally spaced intervals to yield a statistically refined resolver indicated position-time relationship. Once this statistical relationship is known, the indicated vane position is then obtained from a least square line fit of the position-time relationship at the time the vane crossing occurred.

The velocity calculator 206 which typically takes the form of a program subroutine includes a circular nine position buffer (not shown) which maintains the last nine normalized resolver position readings. From the last 9 resolver readings, the statistical resolver velocity is then determined and the least square resolver position-time fit is obtained.

The statistical resolver velocity information calculated by velocity calculator 206 is supplied to a vane position calculator 208 which calculates the indicated vane position from the least square resolver position-time information and the vane time, that is, the time at which a vane crossing occurred.

The indicated vane position calculated by the vane position calculator 208 is compared at summing amplifier 210 with the actual vane position as known by the nominal vane position table 212. The vane position detector 212 takes the form of a look up table which cross references the indicated vane position and the status of the Hall effect sensor closest to the indicated position of the crossed vane. The difference between the indicated and actual vane positions represents the vane position error.

The foregoing subroutines, when executed by the computer 40, in the manner described above act to process the feedback data from the vane detector and from the resolver to determine the position error. As can now be appreciated, timing information as to when the resolver zero crossing occurred as well as when the vane crossing occurred enables position error to be accurately determined. The feedback processor, formed by the computer 40 together with the above described subroutines, may also be employed with other types of position sensors, such as a spindle probe 300 as illustrated in FIG. 1, for determining position error. Those skilled in the art can readily appreciate that a spindle probe, such as spindle probe 300 of FIG. 1 could be coupled to the feedback processor in place of the vane detector head 56 to verify the slide position. Instead of recording the time at which a vane crossing occurred, the vane crossing time latch 184 would instead record the time at which the spindle probe contact occurred so as to enable the vane position calculator 208 to calculate the discrepancy between the measured and the nominal spindle probe position at the instant the spindle probe contact occurred.

To compensate for position errors attributable to fabrication deficiencies, there is provided within the computer 40 a laser table 214. Laser table 214 contains entries which each represent the position error at a given slide position. Each entry is obtained during initial machine tool fabrication with the aid of a laser interferometer and hence, the term laser table. Selection of the appropriate table entry is accomplished by supplying the normalized velocity value computed by the velocity calculator 206 to an integrator 215. The integrator 215 in turn supplies the laser table with information indicative of the current position so that the laser table can yield the appropriate stored error value.

The output of summing amplifier 210 representing the vane position error, and the fabrication position error supplied from the laser table 214, as integrated by an integrator 216, is summed at a summing amplifier 218 to yield total position error. The output of summing amplifier 218 is differentiated by a differentiator 224.

To achieve the desired positioning of slide 14, the output signal of differentiator 224 is summed at a summing amplifier 225 with the output signal of interpolator 226. The interpolator 226 takes the form of a well-known program subroutine which converts the machine part program commands into incremental position commands. Thus, the output signal of summing amplifier 225 represents the sum of the interpolator command and the incremental corrections dictated by the differentiator 224. The summing amplifier 225 output signal is then combined at summing amplifier 227 with the resolver velocity calculator 206 output signal representing the actual velocity to yield a net incremental position error at the integrator 228 input.

The output signal of summing amplifier 227 is integrated by integrator 228 and then is scaled by scaler 229 before being converted into an analog signal by digital to analog converter 230. It is the analog velocity command signal from D/A converter 230 which excites servo drive system 42.

Thus far, what has been described are the constituent elements of the automatic dynamic error compensator, namely the position verifier 52, the feedback transducer and feedback circuit 38, and a feedback processor which includes computer 40 programmed with the subroutines previously described. The overall operation of the automatic dynamic error compensator, which can be used as a length standard for measurement, is controlled by an executive program resident within the memory of the computer. The program is illustrated in flow chart form in FIG. 11.

Figure 11:
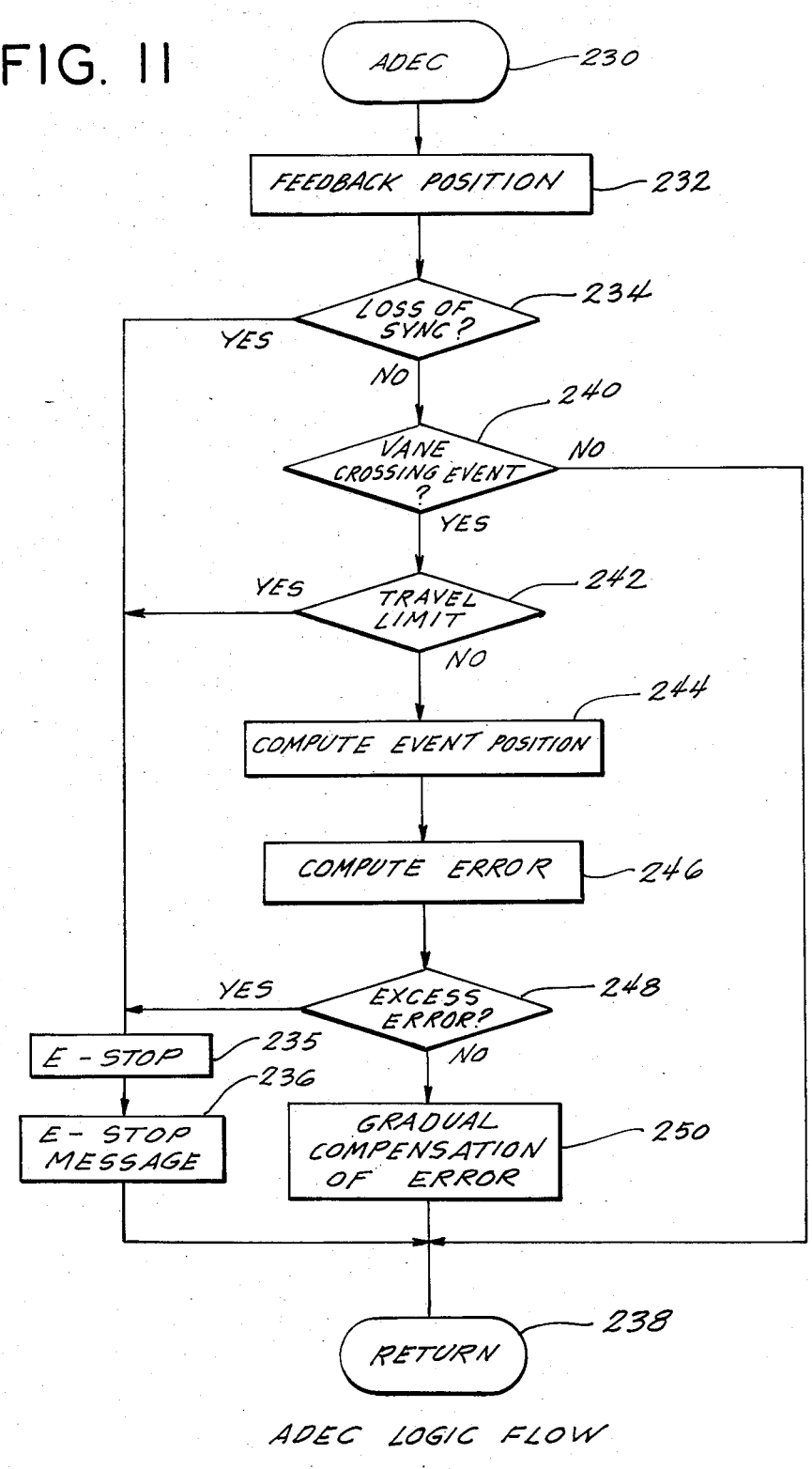
FIG. 11 is a flow chart representation of the executive program of the automatic dynamic error compensator of the present invention.

Referring to FIG. 11, automatic dynamic error compensation is initiated by designating operation of the automatic dynamic error compensation program (Step 230). Thereafter the nominal slide position is calculated (Step 232) by executing each of the program subroutines 200, 202 and 206 described previously. Once the nominal slide position is determined, the "synchronism" of the vane detectors is checked (Step 234). The nominal position of each vane as determined from the resolver is compared to where the vane should be. If the error discrepancy between the indicated vane edge position and the known vane edge position is greater than a predetermined value, a serious equipment failure is presumed to have occurred and an emergency stop condition is entered (Step 235) and an emergency message is displayed (Step 236). Thereafter control returns to the main program (Step 238). Otherwise, if no loss of synchronism is detected, then a determination is made (Step 240) as to whether a vane crossing has occurred, as reflected by a change in the logic state of the EVENT signal generated by the programmable array logic gate 183 of FIG. 10. The lack of a vane crossing results in return to the main program (Step 238).

Should a vane crossing occur, then the determination is made (Step 242) as to whether or not the machine tool slide has exceeded its travel limits. This subroutine duplicates the function of AND gate array 190 of FIG. 10. The existence of an overtravel condition causes control to branch to step 235 whereupon an emergency stop condition is entered and an emergency stop message is generated (Step 236) after which control is returned to the main program (Step 238).

A failure to detect an overtravel condition causes execution of Step 244 during which the indicated and actual position of the vane just crossed is determined by executing subroutines 208 and 212 described previously. Thereafter, the actual vane position is compared to the indicated vane position (Step 246) to yield a position error representing the difference therebetween. In addition, not only is the nominal position compared to the actual vane position, but also, the actual distance between vanes, or between nibs on a single vane depending on the particular slide position, is then compared to the indicated distance of slide travel to yield a distance error. The position and distance error are compared to predetermined values (Step 248). Should either error value exceed its predetermined value, then control branches to Step 235, whereupon an emergency stop condition is entered and an emergency stop message is generated (Step 236) before control returns to the main program (Step 238). If neither error value exceeds its predetermined error limit, then, the error is gradually compensated for in the manner described previously with respect to FIG. 2 by introducing the error value into the position control subroutine. Once the gradual compensation of error is effected, then control returns to the main program (Step 238) to await reexecution of the above described program.

The foregoing described an automatic dynamic error compensator for compensating machine slide position errors due to thermal drift or fabrication defects. While only certain preferred features of the invention have been shown by way of illustration, many modifications and changes will occur to those skilled in the art. For example, although the feedback transducer has been described as a resolver, other types of feedback transducers, such as an encoder, could be utilized. Also, while the invention has been described for use on linear servo drives, it is equally applicable for rotary servo drives as well. In addition, there are alternative position verifiers that could be built using optical, inductive, or radiation techniques.

There are also alternatives to the vanes. For example, a continuous tape with perforations or non-magnetic regions may be used. Vanes might also be produced with laminates which are fabricated by etching to produce the equivalent of vane edges. It is, therefore, to be understood that the appended claims are intended to cover all such modifications and changes as fall within the true spirit of the invention.

What is claimed is:

1. In a machine tool controlled by a numberical control circuit comprising:
   a base,
   a movable member carried by said base for movement in a prescribed path of travel,
   a servo positioning system connected to drive the movable member along its path of travel in accordance with commands received from a recorded program,
   a transducer responsive to the movement of the movable member for producing a position signal which represents the indicated position of the movable member at any instant of time,
   the improvement comprising, a position verifier actuated by the passage of said movable member past a predetermined point on said base to produce a verifier signal indicating a precise actual position of the movable member at the instant said verifier signal occurs,
   a feedback processor coupled to receive the position signal from said transducer,
   means coupling said feedback processor to receive the verifier signal from said position verifier,
   means in said feedback processor for determining the difference between the indicated position of the movable member as represented by said transducer position signal and the actual position as represented by said verifier signal and to generate therefrom a compensation factor signal,
   and adjustment means in the numerical control circuit connected to receive said compensation factor signal for adjusting the control of the movement of the movable member so that it is precisely positioned according to the command from the program.

2. A machine tool according to claim 1 wherein said position verifier comprises,
   a vane formed of a temperature stable material mounted on said base along the path of travel of said movable member and presenting at least one clearly defined edge extending transverse to the path of travel of said movable member,
   a vane detector carried by said movable member for movement with said movable member in a path that passes by said edge,
   and means in said vane detector for producing said verifier signal as said vane detector passes said edge to indicate the actual position of the movable member.

3. A machine tool according to claim 2 wherein said vane detector comprises,
   a housing having a longitudinally extending slot positioned to receive said vane upon passage of said vane detector past said vane,
   a magnet disposed in said housing on one side of the slot so that the path of its magnetic flux is perpendicular to the slot,
   and a Hall effect sensor mounted in said housing on the other side of the slot opposite said magnet for generating said verifier signal at the moment that said edge of the vane passes between said magnet and said Hall effect sensor to interrupt the passage of the magnetic flux to said sensor.

4. A machine tool according to claim 2 wherein said feedback processor comprises,
   a first circuit coupled to receive the position signal from said transducer,
   means in said feedback processor responsive to said position signal to generate an indicated position count representing the indicated movable member position and a position time count indicative of the time at which the movable member was in the indicated position,
   a second circuit coupled to receive said verifier signal from said position verifier and to generate a vane crossing time count signal indicative of the time at which said verifier signal was generated,
   a third circuit coupled to said first and second circuits,
   means in said third circuit responsive to said indicated position count and said position time count to establish the indicated movable member position at the time represented by said vane crossing time count,
   means in said third circuit for determining the actual position of said movable member when the verifier signal was generated,
   and means in said third circuit for determining the difference between the indicated movable member position and the actual movable member position and generating said compensation factor signal therefrom.

5. A machine tool according to claim 1, wherein said position verifier comprises,
   a vane formed of a temperature stable material presenting at least one clearly defined edge at a known precise location along the path of travel of said movable member,
   a vane detector,
   means mounting said vane and vane detector for movement relative to each other with the movement of said movable member and in position so that said vane detector will pass by said edge,
   and means in said vane detector for producing said verifier signal as said vane detector passes by said edge for indicating the precise position of the movable member.

6. A machine tool according to claim 5 wherein said vane presents a plurality of clearly defined edges including
   an electronic memory for recording the precise position of each of said edges along said base,
   and wherein said vane detector produces a verifier signal each time it passes one of said edges for establishing the precise position of said movable member relative to said base at the time each verifier signal is generated.

7. A method for automatically and dynamically adjusting for position errors arising in the movement of a movable member of a machine in accordance with a specific program as the movable member is being driven by a servo drive system having a feedback system with a transducer comprising the steps of precisely verifying the passage of said movable member past a precisely known location along its fixed path of travel to determine its actual position, determining the indicated position of said movable member as indicated by said servo system at the time said movable member passes by said location on said fixed path, generating an error value in accordance with the difference between said indicated movable member position and the actual movable member position at the time said movable member passed by said precisely known location, and adjusting the indicated movable member position in accordance with the established error value.

8. The method according to claim 7 including generating a verifier signal when the movable member arrives at the known location, and determining the position of the transducer in said feedback system at the moment said verifier signal is generated for establishing the indicated position of the movable member.

9. In a machine tool controlled by a numerical control circuit comprising:

a base, a movable member carried by said base for movement in a prescribed path of travel, a servo positioning system connected to drive the movable member along its path of travel in accordance with commands received from a recorded program, a transducer responsive to the movement of the movable member for producing a position signal which represents the indicated position of the movable member at any instant of time, the improvement comprising, a vane detector housing supported for movement with said movable member, a pair of magnets supported in said housing in spaced relationship, a Hall effect sensor mounted opposite each of said magnets in the path of the magnetic flux emanating from its cooperating magnet, a marker vane mounted on said base along the path of travel of said movable member in position to be straddled by each of said magnets and their cooperating Hall effect sensor as the movable member moves along its path of travel for interrupting the passage of the magnetic flux to the Hall effect sensor, said marker vane being of a length that is less than the spacing between said two Hall effect sensors so that both Hall effect sensors cannot be activated simultaneously by said marker vane, means connected to produce said verifier signal when said marker vane interrupts the passage of the magnetic flux from a magnet to its cooperating Hall effect sensor, an overtravel vane at each limit of movement of said movable member having a length that is greater than the spacing between said two Hall effect sensors so that the passage of magnetic flux to both Hall effect sensors can be interrupted simultaneously by said overtravel vane, and means connected to produce a stop signal for stopping the travel of the movable member at its limits of movement when both Hall effect sensors are activated simultaneously.

10. In a machine tool controlled by a numerical control circuit comprising, a base, a movable member carried by said base for movement in a prescribed path of travel, a servo positioning system connected to drive the movable member along its path of travel in accordance with commands received from a recorded program, a transducer responsive to the movement of the movable member for producing a position signal which represents the indicated position of the movable member at any instant of time, the improvement comprising, a pair of sensors mounted in spaced relationship for movement with said movable member, a marker vane mounted on said base along the path of travel of said movable member in position to actuate said sensors as they move past said marker vane, said marker vane having a length that is less than the spacing of said sensors so that the marker vane can only actuate said sensors sequentially, means responsive to the individual actuation of said sensors to produce a verifier signal and connected to transmit it to the numerical control circuit to establish a precise actual position of said movable member in relation to said base, an overtravel vane mounted on said base at each limit of movement of said movable member, each of said overtravel vanes having a length that is at least equal to the spacing of said sensors so that said overtravel vanes will actuate both of said sensors simultaneously, and means responsive to the simultaneous actuation of both of said sensors to produce a stop signal and connected to transmit it to the numerical control circuit for stopping the movement of said movable member when it arrives at either of its limits of travel.

\* \* \* \* \*